US012641252B2

(12) United States Patent
Chong et al.

(10) Patent No.: US 12,641,252 B2
(45) Date of Patent: May 26, 2026

(54) CO-OPTIMIZATION OF HARDWARE-BASED ENCODING AND SOFTWARE-BASED ENCODING

(71) Applicant: Google LLC, Mountain View, CA (US)

(72) Inventors: In Suk Chong, Mountain View, CA (US); Jeremy Christopher Dorfman, Burlington, MA (US); Aki Kuusela, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 136 days.

(21) Appl. No.: 18/145,346

(22) Filed: Dec. 22, 2022

(65) Prior Publication Data

US 2024/0214582 A1 Jun. 27, 2024

(51) Int. Cl.
| | |
|---|---|
| *H04N 19/172* | (2014.01) |
| *H04N 19/105* | (2014.01) |
| *H04N 19/154* | (2014.01) |
| *H04N 19/159* | (2014.01) |

(52) U.S. Cl.
CPC ......... *H04N 19/172* (2014.11); *H04N 19/105* (2014.11); *H04N 19/154* (2014.11); *H04N 19/159* (2014.11)

(58) Field of Classification Search
None
See application file for complete search history.

(56) References Cited

U.S. PATENT DOCUMENTS

| | | | | | |
|---|---|---|---|---|---|
| 7,251,275 | B2 * | 7/2007 | Wu | ........................ | H04N 19/15 |
| | | | | | 375/240.03 |
| 7,418,037 | B1 * | 8/2008 | Nie | ........................ | H04N 19/14 |
| | | | | | 375/240.03 |
| 8,948,260 | B2 * | 2/2015 | Tian | ..................... | H04N 19/137 |
| | | | | | 375/240.13 |
| 8,948,529 | B1 * | 2/2015 | Maaninen | ............ | H04N 19/194 |
| | | | | | 382/238 |
| 9,621,917 | B2 * | 4/2017 | Kottke | ................. | H04N 19/517 |
| 10,057,590 | B2 | 8/2018 | Huang et al. | | |
| 10,091,507 | B2 * | 10/2018 | Lee | ..................... | H04N 19/176 |
| 10,771,789 | B2 | 9/2020 | John | | |

(Continued)

FOREIGN PATENT DOCUMENTS

| | | | | | |
|---|---|---|---|---|---|
| CA | 2396305 C | * | 3/2013 | ............. | H04N 19/14 |
| JP | 2009260437 A | * | 11/2009 | ........... | H04N 19/192 |

OTHER PUBLICATIONS

Parthasarathy Ranganathan et al., "Warehouse-Scale Video Acceleration", pp. 18-26, Mar. 31, 2022, IEEE Micro ( vol. 42, Issue: 4, Jul. 1-Aug. 2022).

(Continued)

*Primary Examiner* — Stefan Gadomski

(74) *Attorney, Agent, or Firm* — Lowenstein Sandler LLP

(57) ABSTRACT

A media item to be provided to users of a platform is identified. The media item includes multiple frames. Metrics for the frames of the media item are obtained. A frame type associated with each of the frames is determined based on the metrics. The media item is determined, based on the frame type associated with each frames, to be encoded using two or more of a hardware encoder, a software encoder, or a hybrid encoder. The frames of the media item are encoded using the two or more of the hardware encoder, the software encoder, or the hybrid encoder in accordance with the determination.

17 Claims, 5 Drawing Sheets

(56)　　References Cited

U.S. PATENT DOCUMENTS

| | | | | |
|---|---|---|---|---|
| 10,841,604 | B2 * | 11/2020 | Horowitz | H04N 19/124 |
| 11,159,801 | B2 * | 10/2021 | Kottke | H04N 19/50 |
| 2003/0039308 | A1 * | 2/2003 | Wu | H04N 19/172 |
| | | | | 375/E7.193 |
| 2003/0235220 | A1 * | 12/2003 | Wu | H04N 19/00 |
| | | | | 375/E7.176 |
| 2003/0235247 | A1 * | 12/2003 | Wu | H04N 19/194 |
| | | | | 375/E7.181 |
| 2005/0012646 | A1 * | 1/2005 | Kang | H03M 5/02 |
| | | | | 341/58 |
| 2005/0036548 | A1 * | 2/2005 | He | H04N 19/172 |
| | | | | 375/240.03 |
| 2006/0222078 | A1 * | 10/2006 | Raveendran | H04N 19/137 |
| | | | | 375/E7.122 |
| 2007/0230565 | A1 * | 10/2007 | Tourapis | H04N 19/107 |
| | | | | 375/E7.176 |
| 2008/0037864 | A1 * | 2/2008 | Zhang | H04N 19/61 |
| | | | | 382/156 |
| 2009/0154816 | A1 * | 6/2009 | Swazey | H04N 19/142 |
| | | | | 382/232 |
| 2013/0034146 | A1 | 2/2013 | Jeong et al. | |
| 2013/0156098 | A1 | 6/2013 | Schwartz et al. | |
| 2013/0300940 | A1 * | 11/2013 | Amon | H04N 19/87 |
| | | | | 348/700 |
| 2014/0161172 | A1 | 6/2014 | Wang et al. | |
| 2014/0205012 | A1 * | 7/2014 | Lee | H04N 19/42 |
| | | | | 375/240.16 |
| 2015/0281709 | A1 * | 10/2015 | Bracha | H04N 19/65 |
| | | | | 375/240.26 |
| 2017/0006294 | A1 * | 1/2017 | Huang | H04N 19/439 |
| 2018/0338146 | A1 * | 11/2018 | John | H04N 19/14 |
| 2019/0200053 | A1 * | 6/2019 | Van Veldhuisen | |
| | | | | H04N 21/2343 |
| 2019/0373278 | A1 * | 12/2019 | Castaneda | H04N 19/172 |
| 2019/0394491 | A1 * | 12/2019 | Han | H04N 19/66 |
| 2022/0239923 | A1 * | 7/2022 | Chaudhari | H04N 19/103 |
| 2023/0010681 | A1 * | 1/2023 | Kossentini | H04N 19/103 |
| 2023/0101806 | A1 * | 3/2023 | John | H04N 19/40 |
| | | | | 375/240.02 |
| 2023/0396766 | A1 * | 12/2023 | Xie | H04N 19/42 |
| 2024/0226731 | A1 * | 7/2024 | Hong | G06T 9/00 |
| 2024/0267532 | A1 * | 8/2024 | Zhernov | H04N 19/136 |

OTHER PUBLICATIONS

International Search Report and Written Opinion for International Application No. PCT/US2023/085556, mailed Jul. 3, 2024, 19 Pages.

* cited by examiner

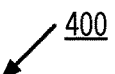

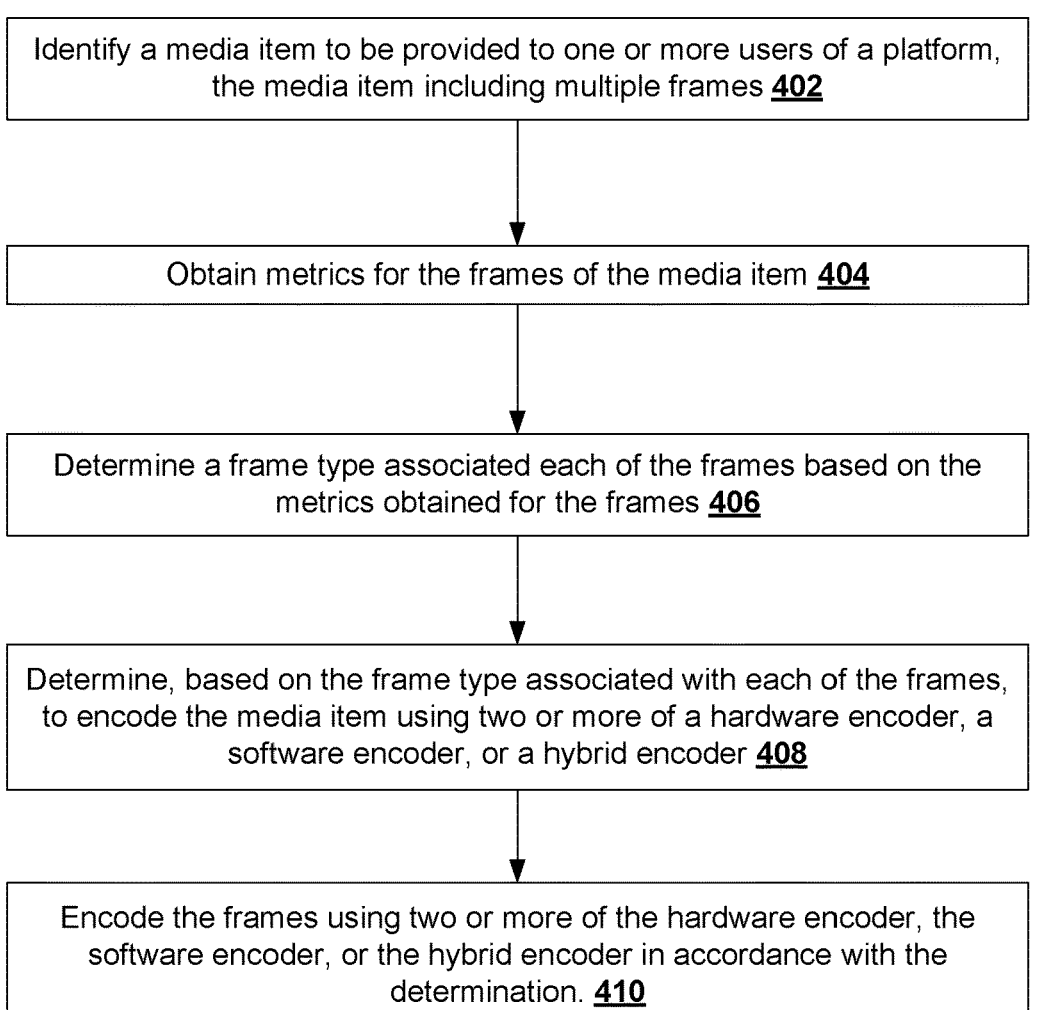

Identify a media item to be provided to one or more users of a platform, the media item including multiple frames 402

Obtain metrics for the frames of the media item 404

Determine a frame type associated each of the frames based on the metrics obtained for the frames 406

Determine, based on the frame type associated with each of the frames, to encode the media item using two or more of a hardware encoder, a software encoder, or a hybrid encoder 408

Encode the frames using two or more of the hardware encoder, the software encoder, or the hybrid encoder in accordance with the determination. 410

FIG. 4

CO-OPTIMIZATION OF HARDWARE-BASED ENCODING AND SOFTWARE-BASED ENCODING

TECHNICAL FIELD

Aspects and implementation of the present disclosure relate to co-optimization of hardware-based encoding and software-based encoding.

BACKGROUND

A platform (e.g., a content sharing platform) can enable users to share video, audio, and other content. For example, a user can generate a video (e.g., using a client device) and can provide a video to the platform (e.g., via the client device) to be accessible by other users of the platform. Content received from a client device can be in a format that is native to the client device. The platform can encode the received content from the native format to one or more other formats associated with the platform.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor to delineate any scope of the particular implementations of the disclosure or any scope of the claims. Its sole purpose is to present some concepts of the disclosure in a simplified form as a prelude to the more detailed description that is presented later.

In some implementations, a system and method are disclosed for co-optimization of hardware-based encoding and software-based encoding. In an implementation, a method includes identifying a media item to be provided to one or more users of a platform. The media item includes multiple frames. The method further includes obtaining metrics for the multiple frames of the media item. The method further includes determining a frame type associated with each of the frames based on the metrics obtained for the frames. The method further includes determining, based on the frame type associated with each of the frames, to encode the media item using two or more of a hardware encoder, a software encoder, or a hybrid encoder. The method further includes encoding the frames using two or more of the hardware encoder, the software encoder, or the hybrid encoder in accordance with the determination.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to specific aspects or implementations, but are for explanation and understanding only.

FIG. 4 is a flow diagram illustrating an example method of co-optimization of hardware-based encoding and software-based encoding, in accordance with an implementation of the disclosure.

DETAILED DESCRIPTION OF THE DRAWINGS

Figure 1:
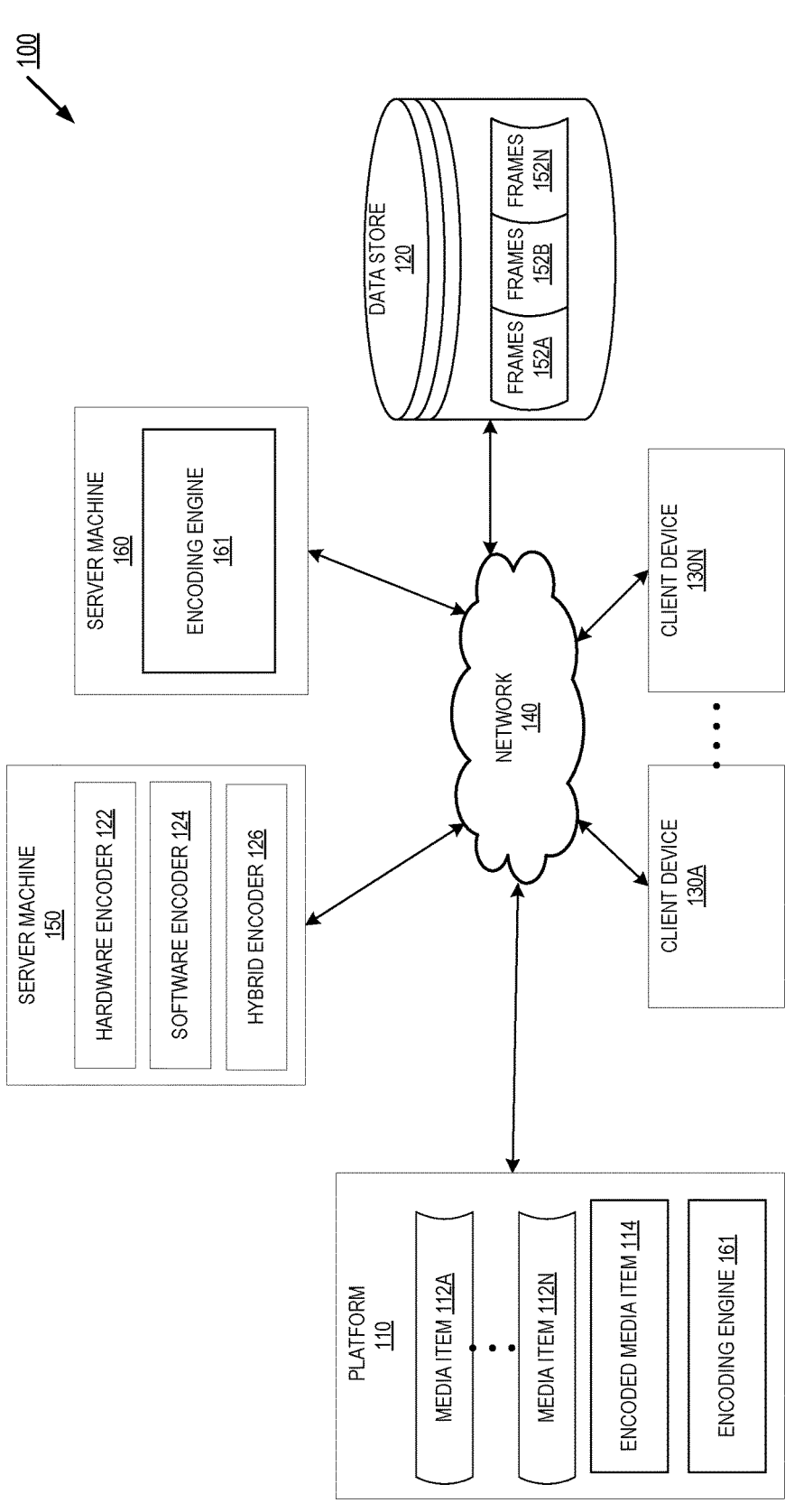
FIG. 1 illustrates an example system architecture, in accordance with implementations of the present disclosure.

Aspects of the present disclosure generally relate for co-optimization of hardware-based encoding and software-based encoding at a platform. A platform (e.g., a content sharing platform, etc.) can enable a user to access a media item (e.g., a video item, an audio item, etc.) provided by another user of the content sharing platform (e.g., via a client device connected to the content sharing platform). For example, a client device associated with a first user of the content sharing platform can generate the media item and transmit the media item to the content sharing platform via a network. A client device associated with a second user of the content sharing platform can transmit a request to access the media item and the content sharing platform can provide the client device associated with the second user with access to the media item (e.g., by transmitting the media item to the client device associated with the second user, etc.) via the network.

In some embodiments, the platform can encode one or more data streams or signals associated with a media item before or while the platform provides access to the media item via a client device. For example, an encoder (e.g., a software encoder) associated with the content sharing platform can encode video signals and/or audio signals associated with a video item before or while the content sharing platform provides a client device with access to the media item. In some instances, an encoder can refer to a device at or coupled to a processing device (referred to herein as a "hardware encoder") associated with the content sharing platform. In other or similar instances, an encoder can refer to a software program (referred to herein as a "software encoder") running on a processing device associated with the platform, or another processing device that is connected to a processing device associated with the platform (e.g., via the network). An encoder can encode one or more data streams or signals associated with a media item to create one or more encoded data streams or signals. The encoder can encode the one or more data streams or signals by restructuring or otherwise modifying the one or more data streams or signals to reduce a number of bits configured to represent data associated with a media item. Accordingly, the one or more encoded data streams or signals can be a compressed version (i.e., have a smaller size than) of the one or more data streams or signals.

Data streams or data signals encoded by a software encoder can be a higher quality than data streams or signals encoded by a hardware encoder. However, the software encoder may consume a larger amount of computing resources and/or take a longer amount of time (referred to as encoding latency) to encode the data streams or signals than the hardware encoder. Depending on characteristics of a media item (e.g., resolution, bit rate, frame rate, duration, etc.), the encoding latency of the software encoder can be significantly large for encoding data streams or signals for the media item. For example, encoding a video in a high-definition (HD) format using a software encoder may take several minutes or hours.

It can be difficult for a platform to select a type of encoder to use for encoding data signals or data streams for a media item. Some platforms process and encode each media item uploaded to the content sharing platform using a hardware encoder, which can encode media items quickly (e.g., within several seconds or minutes) while also consuming a smaller amount of computing resources than a software encoder. However, the encoded stream or signal produced by the hardware encoder and provided to a client device requesting the video may be of low quality. Accordingly, the client device may need to consume a large amount computing resources to process the encoded video stream and provide the video to the user.

Other or similar platforms process and encode media items that are expected to be accessed by a large number of users (e.g., thousands, hundreds of thousands, millions, etc.) using a software encoder and other media items using a hardware encoder. However, it can be difficult for a platform to accurately predict which media items are to be accessed by a large number of users. As such, the platform may use a software encoder to encode media items that are accessed by a small number of users, which can increase overall encoding latency for the platform and/or waste a large number of computing resources. Additionally or alternatively, the platform may use a hardware encoder to encode media items that are accessed by a large number of users. The data stream or data signal for such media items can be of low quality, which can negatively impact the experience of a user consuming the media item using a client device. Further, the client device may consume additional resources to process and present the low quality media item to the user, which can impact the performance of the client device (e.g., drain a battery of the client device, cause lagging of the presentation of the media item, etc.), further impacting the user experience.

As indicated above, conventional platforms use either a hardware encoder or a software encoder to encode a media item. A media item can, in some instances, include one or more frames (e.g., video frames, etc.) that each have one or more frame types. A frame type can include an intra-coded picture frame (I-frame), a predicted picture frame (P-frame), a bidirectional predicted picture frame (B-frame), and so forth. Some media frame types can have a higher impact on the overall quality of the encoded data stream or signal for the media item than other media frame types. In one example, an encoder can encode an I-frame using the frame's image data (e.g., pixels), without referring to any other frames of the video. In some instances, an I-frame may be a baseline reference frame for an encoder to encode frames preceding and succeeding the I-frame. Accordingly, the quality of encoding for a respective I-frame of a media item can have a larger impact than other frame types on the overall encoding of a video.

Conventional platforms do not consider frame types for frames of a media item when determining which type of encoder to use to encode the media item. Accordingly, the platform may use a software encoder to encode every frame of the media item, including frames that may not have a significant impact on the overall quality of the encoded data stream or signal. As indicated above, encoding every frame of a media using a software encoder can consume additional computing resources and increase encoding latency, which can decrease an overall efficiency and increase an overall latency for the platform.

Aspects and implementations of the present disclosure address the above and other deficiencies by enabling a platform (e.g., a content sharing platform) to select between a hardware encoder, a software encoder, and/or a combination of hardware and partial software encoder (referred to herein as a hybrid encoder) to encode different frames of a media item based on a frame type of the frames. A hardware encoder can include one or more specialized hardware components configured to encode media times. A software encoder can include a software encoding program operating on a central processing unit (CPU) of or accessible to the platform. The hybrid encoder can include a multiple pass encoder that performs a first pass using a hardware encoder and a second pass using a partial software encoder. The partial software encoder may perform one or more software encoding operations based on the hardware-encoded data stream or signal. For purposes of explanation and illustration herein, the partial software encoder is sometimes referred to as a partial-feature software encoder and the software encoder is sometimes referred to as a full-feature software encoder. Further details regarding the hardware encoder, the software encoder, and the hybrid encoder are provided below.

A content sharing platform may enable users to consume, upload, share, search for, and/or comment on media items. Media items can be or correspond to various types of content such as video, audio, text, images, program instructions, etc. In some instances, the media items can include one or more frames (e.g., video frames, picture frames, etc.). The platform can determine whether to encode a respective frame of the media item using the hardware encoder, the software encoder, and/or the hybrid encoder based on the frame type associated with the respective frame, as described herein. Further details regarding various frame types are provided herein.

Aspects of the present disclosure are directed to a platform that can obtain metrics for frames of the media item to determine a frame type associated with each of the frames. For example, the platform may obtain the metrics by analyzing a group of pictures (GOP) structure and/or by utilizing a temporal (TPL) dependency model to determine the frame type. The GOP structure of a media item can indicate the order in which frame types are arranged across the media item. The TPL model (also referred to herein as "TPL") can identify temporal dependencies across frames of the media item that may indicate a frame type of the frames. Further details regarding TPL and GOP structures are provided herein.

As indicated above, the platform can determine a frame type for each of the frames of a media item based on the metrics determined for the frames. The platform can then select, based on the determined frame type, which encoder to use to encode each respective frame of the media item. In an illustrative example, the platform can determine that one or more frames of the media item are I-frames based on metrics obtained for the frames. The platform can select the software encoder to encode the I-frames, in some embodiments. The platform can further determine that one or more additional frames of the media item are not I-frames (e.g., are P-frames, are B-frames, etc.) and can select the hardware encoder and/or the hybrid encoder to encode the additional frames, in some embodiments. According to aspects of the present disclosure, the platform can encode frames of a media item using different encoders based on a type of each respective frame.

In some embodiments, the platform can select which encoder to use to encode the media item based on additional or alternative factors such as a power level of a client device. For example, the platform can select the hardware encoder to encode the media item when a power level of the client device falls below an identified power level threshold (e.g., low power mode). In some embodiments, the platform can select which encoder to use to encode the media item based on a popularity level (e.g., a number of views the media item is expected to receive by users of the platform). For example, the platform can select the software encoder to encode the media when the expected popularity level of the media item exceeds an identified popularity level threshold.

Aspects of the present disclosure address the above mentioned deficiencies of conventional platforms by providing techniques that enable a platform (e.g., a content sharing platform) to select an encoder to encode a media item on a per-frame basis based on a determined type for each frame of the media item. By encoding different frames of the same media item using different encoders according to frame type, frames that have a smaller impact on the quality of the overall encoded media stream may be encoded using an encoder (e.g., a hardware encoder, a hybrid encoder) that consumes fewer computing resources than other encoders (e.g., a software encoder). Accordingly, more computing resources are available to other processes, which can increase an overall efficiency and decrease an overall latency of the system. Further, embodiments of the present disclosure enable the platform to utilize a hybrid encoder to encode media items, which can encode media items at a higher quality than a hardware encoder without using a full-feature software encoder. Accordingly, fewer computing resources are consumed by the content sharing platform, which can further improve an overall efficiency of a system including the platform and decrease an overall latency of the system. Furthermore, by encoding more impactful frames of media items using a software encoder and/or a hybrid encoder, media items provided to requesting client devices have higher quality and require less computing resources of the requesting client devices to process the encoded media items and present them to the users.

It should be noted that various aspects of the above referenced methods and systems are described in detail herein below by way of example, rather than by way of limitation. The embodiments and examples provided below may reference videos for the purpose of simplicity and brevity only. However, embodiments and examples of the present disclosure can be applied to media items generally and can be applied to various types of content or media items, including for example, audio, text, images, program instructions, etc. Further, embodiments and examples provided below may describe a media item that is provided on-demand (e.g., retrieved from a media item library, etc.). However, embodiments and examples of the present disclosure can be applied to media items that are provided in real time (e.g., live stream media items) and/or according to other techniques (e.g., according to audio conferencing or video conferencing techniques, etc.).

FIG. 1 illustrates an example system architecture 100, in accordance with implementations of the present disclosure. The system architecture 100 (also referred to as "system" herein) includes a platform 110 (e.g., a content sharing platform), a data store 120, one or more client devices 130A-N (referred to generally as "client device 130" herein), and one or more server machines 150-160, each connected to a network 140. In implementations, network 140 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some embodiments, platform 110 can be a content sharing platform that enables users to consume, upload, share, search for, approve of ("like"), dislike, and/or comment on media items 112A-N (referred to generally as "media item 112" herein). Platform 110 may include a website (e.g., a webpage) or application back-end software used to provide a user with access to media items 112 (e.g., via client device 130). A media item 112 can be consumed via the Internet or via a mobile device application, such as a content viewer of client device 130. In some embodiments, a media item 112 can correspond to a media file (e.g., a video file, and audio file, etc.). In other or similar embodiments, a media item 112 can correspond to a portion of a media file (e.g., a portion or a chunk of a video file, an audio file, etc.). As discussed previously, a media item 112 can be requested for presentation to the user by the user of the platform 110. As used herein, "media," media item," "online media item," "digital media," "digital media item," "content," and "content item" can include an electronic file that can be executed or loaded using software, firmware or hardware configured to present the digital media item to an entity. In one implementation, the platform 110 can store the media items 112 using the data store 120. In another implementation, the platform 110 can store media item 112 or fingerprints as electronic files in one or more formats using data store 120. Platform 110 can provide media item 112 to a user associated with client device 130 by allowing access to media item 112 (e.g., via a content sharing platform application), transmitting the media item 112 to the client device 130, and/or presenting or permitting presentation of the media item 112 via client device 130.

In some embodiments, media item 112 can be a video item. A video item refers to a set of sequential video frames (e.g., image frames) representing a scene in motion. For example, a series of sequential video frames can be captured continuously or later reconstructed to produce animation. For purposes or explanation and illustration, a video item can be divided into frames 152A-N. In the example illustrated with respect to FIG. 1, frames 152A-N may be a sequence of one or more frames of a video (e.g., media item 112A). The sequence can be a continuous sequence of non-overlapping frames of the video item, in some embodiments. Video items can be provided in various formats including, but not limited to, analog, digital, two-dimensional and three-dimensional video. Further, video items can include movies, video clips or any set of animated images to be displayed in sequence. In some embodiments, a video item can be stored (e.g., at data store 120) as a video file that includes a video component and an audio component. The video component can include video data that corresponds to one or more sequential video frames of the video item. The audio component can include audio data that corresponds to the video data.

Platform 110 can include multiple channels (e.g., channels A through Z). A channel can include one or more media items 112 available from a common source or media items 112 having a common topic, theme, or substance. Media item 112 can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking," "following," "friending," and so on.

In some embodiments, system 100 can include one or more third party platforms (not shown). In some embodiments, a third party platform can provide other services associated media items 112. For example, a third party platform can include an advertisement platform that can provide video and/or audio advertisements. In another example, a third party platform can be a video streaming service provider that produces a media streaming service via a communication application for users to play videos, TV shows, video clips, audio, audio clips, and movies, on client devices 130 via the third party platform.

In some implementations, data store 120 is a persistent storage that is capable of storing data as well as data structures to tag, organize, and index the data. A data item can include audio data and/or video data, in accordance with embodiments described herein. Data store 120 can be hosted by one or more storage devices, such as main memory, magnetic or optical storage based disks, tapes or hard drives, NAS, SAN, and so forth. In some implementations, data store 120 can be a network-attached file server, while in other embodiments data store 120 can be some other type of persistent storage such as an object-oriented database, a relational database, and so forth, that may be hosted by platform 110 or one or more different machines (e.g., server machines 150-160) coupled to the platform 110 via network 140. Data store 120 may include a media cache that stores copies of media items that are received from the platform 110. In one example, each of the media items 112 may be a file that is downloaded from platform 110 and may be stored locally in media cache. In another example, each media item 112 may be streamed from platform 110 and may be stored as an ephemeral copy in memory of server machine 150 or serve machine 160 until it is encoded.

Client devices 130 may include computing devices such as personal computers (PCs), laptops, mobile phones, smart phones, tablet computers, netbook computers, network-connected televisions, etc. In some examples, client devices 130 may also be referred to as "client devices." Client devices 130 can include one or more computing devices such as personal computers (PCs), laptops, mobile phones, smart phones, tablet computers, netbook computers, network-connected televisions, etc. In some implementations, client device 132 can also be referred to as a "client device." Client device 132 can include a content viewer. In some implementations, a content viewer can be an application that provides a user interface (UI) for users to view or upload content, such as images, video items, web pages, documents, etc. For example, the content viewer can be a web browser that can access, retrieve, present, and/or navigate content (e.g., web pages such as Hyper Text Markup Language (HTML) pages, digital media items, etc.) served by a web server. The content viewer can render, display, and/or present the content to a user. The content viewer can also include an embedded media player (e.g., a Flash® player or an HTML5 player) that is embedded in a web page (e.g., a web page that may provide information about a product sold by an online merchant). In another example, the content viewer can be a standalone application (e.g., a mobile application or app) that allows users to view digital media items (e.g., digital video items, digital images, electronic books, etc.). According to aspects of the disclosure, the content viewer can be a content sharing platform application for users to record, edit, and/or upload content for sharing on platform 110. As such, the content viewers can be provided to the client device 130 by platform 110. For example, the content viewers may be embedded media players that are embedded in web pages provided by the platform 110.

In some embodiments, a client device 130 can transmit a request to platform 110 for access to a media item 112. Encoding engine 161 of platform 110 can cause one or more data streams or signals associated with media item 112 to be encoded before or while platform 110 provides client device 130 with access to the requested media item 112. Encoding engine 161 may identify one or more frames 152A-N of media item 112, in some embodiments. In some embodiments, encoding engine 161 may determine metrics for each of the frames 152A-N and determine a frame type for each of the frames 152A-N based on the determined metrics. Based on the determined frame type, encoding engine 161 can select two or more encoders to encode the media item 112. As illustrated in FIG. 1, server machine 150 can include a hardware encoder 122, a software encoder 124, or hybrid encoder 126. In some embodiments, encoding engine 161 can select one or more of hardware encoder 122, software encoder 124, and/or hybrid encoder 126 to encode one or more of frames 152A-N of media item 121.

Hardware encoder 122 can encode media items 112 using a specialized hardware component built for the purpose of encoding media items. In some embodiments, the specialized hardware component of hardware encoder 122 can reside at server machine 150. In other or similar embodiments, the specialized hardware component of hardware encoder 122 can reside at another computing system of or connected to system 100. In one or more embodiments, hardware encoder 122 can be a live stream hardware encoder that is configured to stream media items to client devices 130 via network 140 (e.g., in real time). Software encoder 124 may include one or more software encoding programs operating on a processing device (e.g., a central processing unit (CPU), a graphics processing unit (GPU), etc.) within system 200. Hybrid encoder 126 may be a multiple pass encoder that includes a hardware encoder component and a partial software encoder component. In some embodiments, hybrid encoder 126 can encode a media item 112 using a hardware encoder component and subsequently reencode media item 112 using a partial software encoder component. The hardware encoder component may generate metrics for the media item 112 based on the hardware encoding. In some embodiments, the partial software encoder component may perform one or more encoding operations on the media item 112 according to the additional metrics generated by the hardware encoder component, as described in detail below. As indicated above, the partial software encoder component of hybrid encoder 126 may be a partial feature software encoder and the software encoder 124 may be a full feature software encoder.

As indicated above, encoding engine 161 can select an encoder for encoding frames 152A-152N of media item 112A based on a type associated with each respective frame. In an illustrative example, encoding engine 161 can determine that one or more of the frames 152A-N may be encoded using hardware encoder 122, one or more of the frames 152A-N may be encoded using software encoder

124, and/or one or more of the frames 152A-N may be encoded using hardware encoder 126 based on the determined types associated with each of the one or more frames 151A-N. Encoding engine 161 can encode one or more data streams or signals associated with a requested media item 112 (represented as encoded media item 114, as illustrated in FIG. 1), in accordance with embodiments provided herein. Platform 110 can transmit the encoded media item 114 to client device 130 (e.g., in response to a request from client device 130).

In some embodiments, client device 130 can include, or be coupled to, an encoder and/or a decoder that is configured to decode an encoded data stream or signal. For example, client device 130 can include a hardware decoder, a software decoder, and/or a hybrid decoder that decodes data using hardware decoding techniques and/or software decoding techniques. Client device 130 can provide the one or more encoded data streams or signals associated with encoded media item 114 as input to the encoder and/or the decoder, which can decode the one or more encoded data streams or signals. In some embodiments, the client device 130 can determine how to decode the encoded media item 114 based the type of encoder used to encode media item 114, as described below. For example, client device 130 can determine (e.g., based on metadata associated with an encoded media item 114) that hybrid encoder 126 was used to encode frames of encoded media item 114. Client device 130 can decode frames of the encoded media 114 using a hybrid decoder (not shown) that decodes the encoded media item 114 using hardware decoding techniques and/or software decoding techniques. The one or more decoded data streams or signals can correspond to requested media item 112. Client device 130 can provide requested media item 112 to a user associated with client device 130 based on the one or more decoded data streams or signals associated with requested media item 112 (e.g., via a user interface (UI) of client device 130).

In some implementations, platform 110 and/or server machines 150-160 may operate on one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to enable a user to access media items provided to platform 110 by other users. In some implementations, the functions of platform 110, and/or server machines 150-160 may be provided by a more than one machine. For example, in some implementations, the functions of encoding engine 161, hardware encoder 122, software encoder 124, and/or hybrid encoder 126 may be provided by two or more separate server machines. Content sharing platform 110, and/or server machines 150-160 may also include a website (e.g., a webpage) or application back-end software that may be used to enable a user to access media items, as described herein.

In general, functions described in implementations as being performed by platform 110 can also be performed on the client devices 130 in other implementations, if appropriate. In addition, the functionality attributed to a particular component can be performed by different or multiple components operating together. Content sharing platform 110 can also be accessed as a service provided to other systems or devices through appropriate application programming interfaces, and thus is not limited to use in websites.

It should be noted that although some embodiments of the present disclosure are directed to a content sharing platform, embodiments of this disclosure can be applied to other types of platforms. For example, embodiments of the present disclosure can be applied to a content archive platform, a content storage platform, etc.

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." In another example, an automated consumer can be an automated ingestion pipeline, such as a topic channel, of the platform 110.

In situations in which the systems discussed here collect personal information about users, or can make use of personal information, the users can be provided with an opportunity to control whether platform 110 collects user information (e.g., information about a user's social network, social actions or activities, profession, a user's preferences, or a user's current location), or to control whether and/or how to receive content from the content server that can be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by the platform 110.

Figure 2:
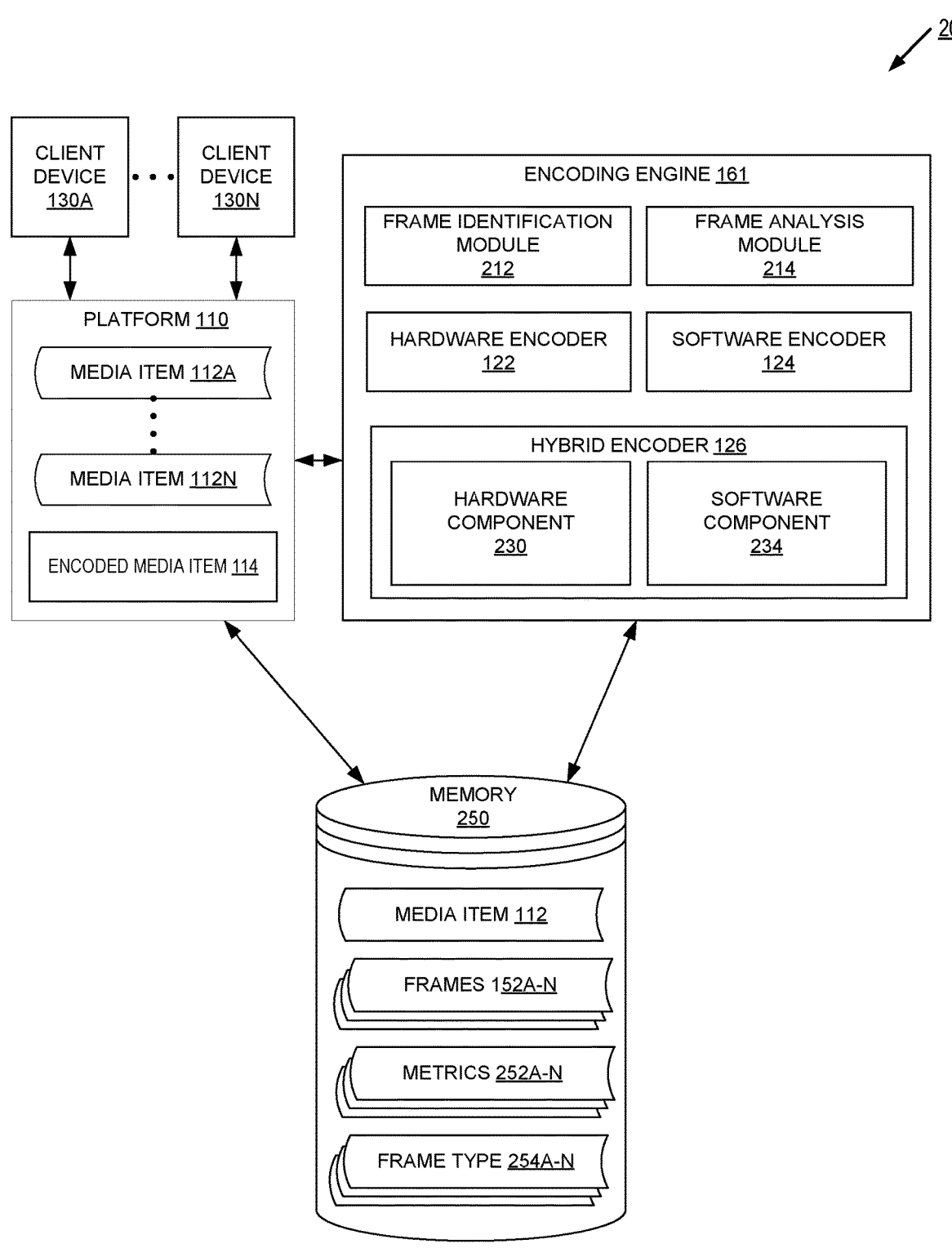
FIG. 2 is a block diagram illustrating a platform and an encoding engine for the platform, in accordance with an implementation of the disclosure.

FIG. 2 is a block diagram illustrating a platform 110 and an encoding engine 161 for the platform, in accordance with an implementation of the disclosure. As described with respect to FIG. 1, platform 110 can enable a user to provide a media item 112 (e.g., a video item) for access by other users of platform 110. In some embodiments, a client device 130 can transmit a request (e.g., via network 140) to platform 110 to make a media item 112 accessible to other users, where the request includes the media item 112. In response to receiving the request with media item 112, platform 110 can provide the media item 112 (or an indication of the media item 112) to encoding engine 161. In other or similar embodiments, platform 110 can store the media item 112 at memory 250 and encoding engine 161 can identify the requested media item 112 from memory 250. In some embodiments, one or more portions of memory 250 can be included at or can otherwise correspond to data store 120, described with respect to FIG. 1. In other or similar embodiments, one or more portions of memory 250 can be included at or can otherwise correspond to another memory of system 100.

As illustrated in FIG. 2, encoding engine 161 can include a frame identification module 212 and/or a frame analysis module 214. In some embodiments, encoding engine 161 can additionally or alternatively include hardware encoder 122, software encoder 124, and/or hybrid encoder 126. In other or similar embodiments, one or more of hardware encoder 122, software encoder 124, and/or hybrid encoder 126 can reside at another computing system of system 100 (e.g., at server machine 150) and can be accessible to encoding engine 161 (e.g., via network 140, via a bus, etc.).

As indicated above, hardware encoder 122 may be or include a specialized hardware component configured to encode media items. In some embodiments, hardware encoder 122 may be or include an application-specific integrated circuit (ASIC) operating on client device 130 and/or server 150 (as illustrated with respect to FIG. 1) optimized to encode media items 112. In at least one embodiment, hardware encoder 122 may be a specialized component of, or included in, a graphical processing unit (GPU) of client device 130 and/or server 150. In some embodiments, hardware encoder 122 can encode a media item 112 according to a codec. A codec refers a method or a format of compressing media items. A codec can include, in some embodiments, MJPEG, H.264, VP9, AV1, etc. As also indicated above, software encoder 124 may be or include a software encoding program operating on a processing unit (e.g., a CPU, a GPU, etc.) of or connected to system 100. Software encoder 124 can encode a media item 121 according to one or more codecs such as MJPEG, H.264, VP9, AV1, etc. As further indicated above, hybrid encoder 126 may be a multiple pass encoder that includes a hardware component 230 and a software component 234, as described in detail below. Once the media item has been encoded (e.g., by hardware encoder 122, software encoder 124, hybrid encoder 126, etc.), it may be provided by platform 110 to one or more client devices 130 that request access to media item 112. In some embodiments, frames 152 of media item 112 can be encoded before or while platform 110 provides a client device 130 with access to media item 112.

Frame identification module 212 may identify one or more fixed sets or variably sized sets of frames 152. In some embodiments, frame identification module 212 may segment media item 112 into fixed sets of frames. For example, every 5 seconds of video data of the media item 112 may be identified as a set of frames. In another example, frame identification module 212 may segment the media stream 112 into variable sized sets of frames (e.g., a first set of frames can include 5 seconds of video data and a second set of frames can include 10 seconds of video data). In yet another example, frame identification module 212 may segment the media stream into individual frames. In any of the above examples, frame identification module 212 may segment the video content of media item 112 into frames 152, each of which contains one or more frames 154 of the video data associated with the media item.

In some embodiments, a media item can include audio content (in addition to or instead of video content). Frame identification module 212 may segment the audio content into multiple audio segments. In some embodiments, Audio data of a video stream may be sampled at a higher frequency (e.g., 48 kHz) and, accordingly, no inter-frame compression is performed for the audio segments (e.g., MP3 audio data). In some embodiments, the audio content of media item 112 may be separated from video or image content without being segmented and the entire audio content may be treated as a single audio segment.

Frame analysis module 214 may obtain metrics 252 for frames 152 and determine a frame type of the frames 152 based on the obtained metrics 252. Frame types may include intra-coded frames (I-frames), predicted frames (P-frames), and/or bi-directional frames (B-frames). In some embodiments, the dimensions of a frame may be expressed in pixel quantities (e.g., 1920×1080), resolution values (e.g., 1080p, 720p, 1080i, 720i), resolution modes (e.g., Standard Definition (SD), High Definition (HD), Ultra High Definition (UHD)), other value, or a combination thereof. Each frame may include blocks of pixels (referred to as "coding units" or "macroblocks" herein) that may be encoded one at a time. In an illustrative example, frames 152 may be divided into 16×16 pixel coding units. To encode a frame, a respective encoder can search for similar coding units to reduce the amount of data that needs to be transmitted. An encoder may search for a matching coding unit within the same frame ("intraframe prediction") or search for a matching coding unit in adjacent frames ("interframe prediction"). An I-frame can include coding units that refer to other coding units within the same frame. A P-frame may refer to coding units of previously encoded frames in addition to its own coding units. A B-frame may refer to coding units within two or more frames that occur before and after the B-frame. B-frames may include reference B-frames and non-reference B-frames. A reference B-frame can serve as a reference for other B-frames and/or P-frames during encoding. A non-reference B-frame may not serve as a reference for other frames during encoding. A poor-quality encoding of a reference B-frame can cause propagation of the poor-quality encoding to other frames that depend on the B-frames (referred to as "propagation losses" herein).

In some embodiments, metrics 252 may include a group of pictures (GOP) structure of a media item 112. Frame analysis module 214 can determine frame types based on the GOP structure of the media item 112. A GOP structure may specify the order in which frame types are arranged in a media item 112, as described below with respect to FIG. 3. In some embodiments, the GOP structure can be defined according to a standards protocol associated with media items 112 hosted by platform 110. In some embodiments, the GOP structure can be defined based on one or more settings associated with the platform 110. In other or similar embodiments, the GOP structure can be defined based on one or more settings associated with a device (e.g., a client device 130, another device, etc.) that generated the media item 112. In some embodiments, an indication of the GOP structure can be provided with media item 112 by a client device 130 (e.g., with a request to make media item 112 accessible to other users of platform 110). In other or similar embodiments, platform 110 can determine the GOP structure when or after the media item 112 is received. In some embodiments, hardware encoder 122 can generate the GOP structure by performing a first encoding pass over the media item 112. The GOP structure can be stored at memory 250 with metrics 252, in some embodiments. Frame analysis module 214 can determine a frame type 254 of a frame 152 based on the GOP structure, as described herein.

Figure 3:
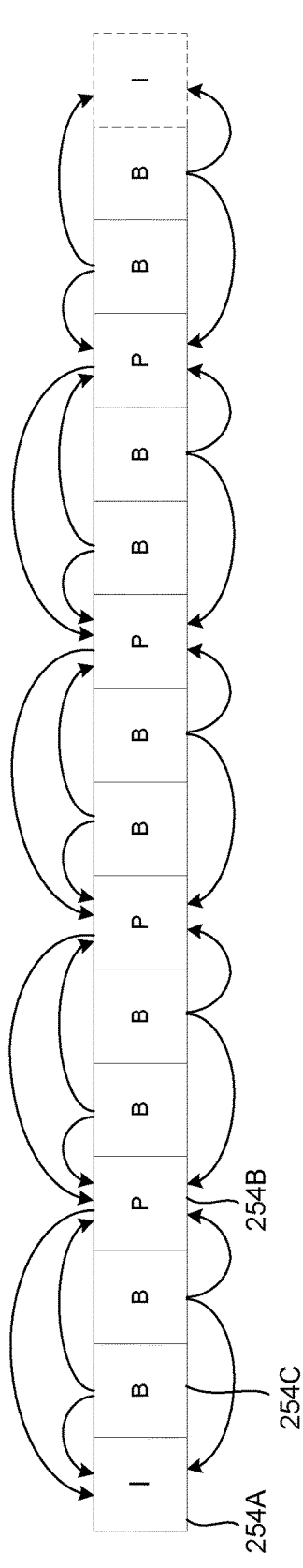
FIG. 3 illustrates an example of a group of pictures (GOP) structure associated with a media item, in accordance with implementations of the present disclosure.

FIG. 3 illustrates an example GOP structure 300 associated with a media item, in accordance with implementations of the present disclosure. It should be noted that example GOP structure 303 is provided for purposes of explanation and illustration only. Other types of GOP structures 300 can be associated with a media item, in accordance with embodiments of the present disclosure. As illustrated by FIG. 3, an I-frame 254A may be included at a beginning of the GOP structure 300. For example, an I-frame 254A may be inserted into media item 112 every 15 frames to form GOP structure 300 with a length of 15 (e.g., in accordance with a standard protocol for media items 112 at platform 110). Accordingly, frame analysis module 214 can determine that the initial frame of the GOP structure 303 has an I-frame type. The inserted I-frame 254A may form a reference for the successive 14 P-frames 254B and B-frames 254C to perform inter-frame prediction of coding units. As illustrated with respect to FIG. 3, the P-frames 254B of the GOP structure 300 may reference redundancies of the preceding I-frame 254A or P-frame 254B during interframe prediction. The B-frames 254C of the GOP structure 300 may reference redundancies of the preceding and succeeding I-frame 254A or P-frame 254B during interframe prediction. As such, the I-frame 254A of the GOP structure 300 may be a baseline reference for the succeeding P-frames 254B and B-frames 254C.

Referring back to FIG. 2, in some embodiments, metrics 252 may include a temporal dependency model to determine a frame type 254 of identified frames 152 of a media item 112. Frame analysis module 214 may use a temporal dependency model (referred to herein as "TPL model" or "TPL") to determine the frame type of frames 152. A TPL may identify temporal dependencies across frames. Temporal dependencies may arise when an encoder encodes a frame based on coding units or pixels of adjacent frames. Extracted temporal features of a video frame, such as the length/entropy of motion vectors and energy of frame residual may reflect the amount of motion present in the video frame that may indicate the temporal dependencies between frames. Frame analysis module 214 can, based on the TPL, identify frames within the media item that have a higher impact on a quality of corresponding subsequent frames according to the amount of motion present in the frames. In some embodiments, frame analysis module 214 may use temporal dependencies extracted via the TPL as metrics 252 to determine a frame type 254 of frames 152. For example, frame analysis module 214 may determine (e.g., via a TPL) that a P-frame, due its temporal dependencies, is more like a I-Frame than a P-frame and indicate as much.

Frame analysis module 214 can analyze metrics 252 and frame type 254 and select one or more encoders to encode the frames 152. In some embodiments, frame analysis module 214 can select one or more encoders to encode each respective frame of media item 112. For example, one or more of the frames 152 may be encoded using hardware encoder 122, one or more of the frames 152 may be encoded using software encoder 124, and one or more of the frames 152 may be encoded using hybrid encoder 126. In some embodiments, frame analysis module 214 may select one or more encoders (e.g., hardware encoder 122, software encoder 124, hybrid encoder 126) to encode frames 152 of a media item 112 based on a frame type 254 determined by a GOP structure and/or a TPL. In other or similar embodiments, frame analysis module 214 can select an encoder to encode frames 152 having the type 254 based on an encoding rule associated with the platform. For example, frames having an I-frame type 254 may correspond to a baseline for interframe dependencies and, therefore, the I-frame encoding may affect the quality and/or efficiency of encoding subsequent frames. A developer can define an encoding rule (e.g., via a client device) that provides that frames 152 having an I-frame type 254A are to be encoded using a software encoder 124 (e.g., to minimize propagation losses and maximize quality of the media item 112). In another example, the developer may provide an encoding rule that provides that frames 152 having a P-frame type 254B are to be encoded using a hardware encoder 122, and/or frames 152 having a B -frame type 254C are to be encoded using a hybrid encoder 126.

In some embodiments, frame analysis module 214 can select an encoder to encode frames 152 having a frame type 254 based on historical quality data associated with the platform. Historical quality data can be collected by the platform based on prior encoded media items encoded using each of the one or more encoders and provided to a client device. The historical data can indicate which encoder of the one or more encoders can optimally encode a particular frame 152 having a frame type 254. For example, historical data can indicate to encode a frame 152A having an I-frame type 254A using a software encoder 124. In another example, frame 152B may have a P-frame type 254B but, due to temporal dependencies according to a TPL, it may be more similar to an I-frame. The historical data may indicate that encoding a P-frame type 254B with certain temporal dependencies using hybrid encoder 126 causes a higher quality than other frame types and/or consumes a fewer amount of computing resources than using other encoders. Accordingly, frame analysis module 214 may select the hybrid encoder 126 to encode frame 152B. In yet another example, frame 152C may be a non-reference B-frame type 254C. The historical data may indicate that non-reference B-frame types have a smaller impact level on the encoding quality of the media item 112. Therefore, the historical data may indicate to encode frame 152C having non-reference B-frame type 254C using a hardware encoder 122. Accordingly, frame analysis module 214 may determine to encode frame 152C using the hardware encoder 122

As indicated above, frame analysis module 214 may select one or more encoders (e.g., hardware encoder 122, software encoder 124, hybrid encoder 126) to encode frames 152 of a media item 112 based on metrics 252. In some embodiments, metrics 252 may include quality impact metric indicating a level of impact of the frames 152 having a particular frame type 254 on a quality (e.g., image quality, etc.) of the media item. In some embodiments, frame analysis module 214 may determine a computing resource constraint associated with encoding the frames 152 using the hardware encoder 122, the software encoder 124, and/or the hybrid encoder 126. A computing resource constraint may indicate the amount of computing resources consumed to encode the frames 152 using a respective encoder. In some embodiments, a developer and/or operator associated with platform 110 can provide (e.g., via a client device) an indication of the computing resource constraint associated with hardware encoder 122, software encoder 124, and/or hybrid encoder 126 for storage at memory 250. Frame analysis module 214 can determine the computing resource constraint with each respective encoder by accessing the constraints at memory 250. In other or similar embodiments, frame analysis module 214 can determine the computing resource constraint based on data (e.g., experimental data, test data, etc.) indicating an amount of computing resources consumed by hardware encoder 122, software encoder 124, and/or hybrid encoder 126 over a time period.

In some embodiments, frame analysis module 214 may determine whether the computing resource constraint associated with each respective encoder satisfies one or more quality criteria in view of the quality impact metric. A computing resource constraint can satisfy the quality criteria if a value of the constraint falls below a threshold value (e.g., a threshold level of computing resources consumed) corresponding to the quality impact metric having the highest value for frames 152 having a respective frame type 254. In some embodiments, frame analysis module 214 can select an encoder to encode frames 152 having the particular frame type 254 by identifying the encoder associated with a computing resource constraint that satisfies the one or more quality criteria. In an illustrative example, frame analysis module 214 can determine that a value for a quality impact metric for frames 152 having an I-frame type 254A is larger than a value for a quality impact metric for frames 152 having a P-frame type 254B and/or a B-frame type 254C. In response to determining that a value of the computing resource constraint associated with software encoder 124 falls below a threshold value corresponding to the quality metric for I-frame types 254A, frame analysis module 214 determine that the quality criteria is satisfied and can select the software encoder 124 for encoding frames 152 having the I-frame type 254A. If the value of the computing resource constraint meets or exceeds the threshold, frame analysis module 214 can determine that the quality criteria is not satisfied and can determine the encoder associated with a computing resource constraint that falls below the threshold value and is closest to the quality metric for I-frame types 254A.

In some embodiments, hardware encoder 122 may be a multiple pass encoder. The multiple pass hardware encoder 122 may perform a first pass that analyzes (e.g., generates metrics 252) of one or more frames as described above (e.g., GOP structure, TPL, etc.), and a subsequent pass that may encode the one or more frames using the information gathered during the analysis. In some embodiments, the hardware encoder 122 may perform a first pass over the one or frames to generate metrics 252 for the one or more frames. For example, frame analysis module 214 may obtain metrics 252C for frames 152C from hardware encoder 122 and, based on metrics 252C, determine a frame type 254C from the first pass of hardware encoder 122. Frame analysis module 214 may determine frame type 254C is a frame type to be encoded using hardware encoder 122 (e.g., based on historic data). Accordingly, hardware encoder 122 may perform a subsequent pass to encode frames 152C.

In some embodiments, metrics 252 may include a power level of a client device 130. Client device 130 may enable a client device to capture audio and image data sensed by the client device (e.g., record) to create a media item 112 (e.g., a video). According to the power level of the client device 130, frames of the media item may be encoded using either a hardware encoder 122, a software encoder 124, or a hybrid encoder 126. In some embodiments, a developer and/or operator associated with platform 110 can provide (e.g., via a client device) an indication of a threshold power level associated with the client device. Frame analysis module 214 can select an encoder to encode the media item 112 by identifying the encoder associated with the provided threshold power level. For example, frame analysis module 214 can determine a client device 130 has less power available than the indicated threshold power level (e.g., low power mode) associated with the hybrid encoder 126 and the software encoder 124. In response to determining the client device has less power available than the indicated threshold power level associated with the hybrid encoder 126 and the software encoder 124, frame analysis module 214 can select the hardware encoder 122 to encode media item 112.

In some embodiments, metrics 252 may include an expected popularity level of a media item. As indicated above, platform 110 may enable users to share media items 112 with other users of the platform 110. The platform 110 an determine the expected popularity level of the media item for the media item 112 (e.g., using a predictive model, based on a category or type of the media item, etc.). The expected popularity level can be indicated by a number of instances the media item 112 is expected to be viewed and shared by other users of the platform 110, in some embodiments. According to the expected popularity level of a media item uploaded by a client device, the media item may be encoded using either a hardware encoder 122, a software encoder 124, or a hybrid encoder 126. In some embodiments, a developer and/or operator associated with platform 110 can provide (e.g., via a client device) an indication of a threshold popularity level associated with the one or more encoders. Frame analysis module 214 can select an encoder to encode the media item 112 by identifying the encoder associated with the provided threshold expected popularity level. For example, a first user may share a media item 122A to platform 110 that the platform expects to the reach a first expected popularity level. Frame analysis module 214 can determine that the first expected popularity level is greater than the threshold popularity level associated with software encoder 124. In response to determining the first expected popularity level is greater than the threshold popularity level associated with the software encoder 124, frame analysis module 214 can select the software encoder 124 to encode media item 112A. In another illustrative example, a second user may share a media item 122B to platform 110 that the platform expects to the reach a second expected popularity level. Frame analysis module 214 can determine that the second expected popularity level is greater than the threshold popularity level associated with hybrid encoder 126 but lesser than the threshold popularity level associated with the software encoder 124. In response to determining the first expected popularity level is greater than the threshold popularity level associated with the hybrid encoder 126 but lesser than the threshold popularity level associated with the software encoder 124, frame analysis module 214 can select the hybrid encoder 126 to encode the media item 112B. In yet another illustrative example, a third user may share a media item 122C to platform 110 that the platform expects to the reach a third expected popularity level. Frame analysis module 214 can determine that the third expected popularity level is lesser than the threshold popularity level associated with hybrid encoder 126 and lesser than the threshold popularity level associated with the software encoder 124. In response to determining the first expected popularity level is lesser than the threshold popularity level associated with the hybrid encoder 126 and lesser than the threshold popularity level associated with the software encoder 124, frame analysis module 214 can select the hardware encoder 126 to encode the media item 112C.

As indicated above, hybrid encoder 126 may encode media item 112. Hybrid encoder 126 may encode frames of a media item 112 responsive to encoding engine 161 analyzing of metrics 252 (e.g., via a first pass of hardware encoder 122). Hybrid encoder 126 may be a multiple pass encoder that includes a hardware component 230 and a software component 234. In some embodiments, hardware component 230 may perform a second pass on the media item 112 that encodes and analyzes frames 152 of the media item 112 using a hardware encoder, and software component 234 may perform a third pass on the media item 112 that transcodes the media item using a partial software encoder.

In some embodiments, hardware component 230 may be or otherwise correspond to hardware encoder 122. In other embodiments, hardware component 230 may be a hardware encoder separate from hardware encoder 122. Hardware component 230 may be a specialized hardware component built for the purpose of encoding media items. As indicated above, hardware component 230 may be configured to encode frames of media item 112. In some embodiments, hardware component 230 may perform encoding operations that may include a second pass over the media item 112. Hardware component 230 may generate additional metrics based on the second pass of hardware encoding. In some embodiments, the additional metrics may be generated from decoding encoded frames. In some embodiments, the additional metrics may include outputs generated by the hardware encoding operations performed by the hardware component 230 over the media item 112. For example, the additional metrics may include motion tree statistics generated by hardware component 230. Motion tree statistics may include motion vectors that indicate the amount of motion present in the frame.

In some embodiments, software component 234 may include a partial software encoder, as indicated above. In some embodiments, software component 234 can encode frames of media item 112. In some embodiments, software component 234 may perform encoding operations that may include a third pass over the media item 112. Software component 234 may perform one or more software encoding operations over media based on the additional metrics generated by hardware component 230 to improve the encoding quality of the frames. In some embodiments, software component 234 may only perform minimum bitstream touching by recoding motion vectors generated by hardware component 230 and optimizing entropy coding cost.

In some embodiments, a software encoding operation can include reperforming the interframe and intraframe comparison for each coding unit. Software component 234 may use motion vectors from motion tree statistics generated by hardware component 230 to determine rate-distortion optimization (RDO). RDO may include optimizing the amount of propagation losses against the amount of data (e.g., bits) required to transcode the video using software component 234. Software component 234 may use the motion vectors form the motion tree statics to perform RDO between frames (interframe) of the media item and within frames (intraframe) of the media item.

In some embodiments, additional software encoding operations may include optimizing motion vectors, redoing more optimal in-loop filter decision, TxType decision, full trellis-based coefficient decision, test sub-partition, improved motion field uniformity/motion vector coherency, missing tools evaluation, partition decision override, etc. Each of the above additional encoding operations may result in a quality gain at the expense of computing resources and time.

In some embodiments, frame analysis module 214 can select a different set of encoding operation for different frames of the same media item. For example, some of the frames may be re-encoded using only interframe and intra frame comparison while other frames may be re-encoded using interframe/intraframe comparison, TxType decision, full trellis-based coefficient decision, and improved motion vector coherency. Combinations of one or more encoding operations may be utilized to optimize quality gain and CPU resource consumption for each of frames 152.

As described above, the platform 110 may send encoded media item 114 to a client device 130. In some embodiments, one or more components of client device 130 (e.g., an operating system, another software component, etc.) can determine how to decode an encoded media item 114 (e.g., an encoded video stream) based a type of encoder used to encode frames of encoded media item 114 (e.g., by encoding engine 161). In some embodiments, metadata for encoded media item 114 can include an indication of a type of encoder (e.g., hardware encoder 122, software encoder 124, hybrid encoder 126) that was used to encode frames 152 of media item 114. Client device 130 can determine the type of encoder used to encode a respective frame 152 of encoded media item 114 based on the metadata, in some embodiments. In other or similar embodiments, client device 130 can determine one or more characteristics of frames of encoded media item 114 and determine a type of encoder used to encode the frames of encoded media item 114 based on the determined characteristics. The characteristics of frames 152 can correspond to metrics 252 determined in accordance with previously described embodiments.

As indicated above, client device 130 can include or otherwise be coupled to a hardware decoder, a software decoder, and/or a hybrid decoder. In some embodiments, client device 130 can select a type of decoder to use to decode the encoded media item 114 based on the determined type of encoder used to encode encoded media item 114. In an illustrative example, metadata associated with the encoded media item 114 may indicate that encoding engine 161 used hardware encoder 122 to encode encoded media item 114. Client device 130 can select a hardware decoder to decode encoded media item 114 responsive to determining that encoded media item 114 was encoded using hardware encoder 122.

FIG. 4 depicts a flow diagram illustrating an example method of co-optimization of hardware-based encoding and software-based encoding, in accordance with an implementation of the disclosure. Method 400 may be performed by processing logic that may include hardware (circuitry, dedicated logic, etc.), software (e.g., instructions run on a processing device), or a combination thereof. In one implementation, some or all the operations of methods 400 may be performed by one or more components of system 100 of FIG. 1.

Method 400 may be performed by processing devices of a server device or a client device and may begin at block 402. At block 402, a processing device may identify a media item to be provided to one or more users of a platform, the media item including multiple frames. At block 404, the processing device may obtain metrics for the frames of the multiple frames of the media item. In some embodiments, obtaining the metrics for the frames of the media item may include performing a first pass over the frames using a hardware encoder to generate the metrics for the one or more frames. In some embodiments, the metrics for the frames can include a quality impact metric. The quality impact metric can indicate a level of impact of the frame type of each of the frames on a quality of the media item.

At block 406, the processing device may determine a frame type associated with each of the frames based on the metrics obtained for the frames. In some embodiments, the frame type can include one or more of an intra-code picture frame type (I-frames), a predicted picture frame time (P-frame), and a bidirectional predicted picture frame type (B-frame). I-frames, P-frames, and B-frames may have varying degrees of impact on the quality of the media item, as described above.

At block 408, the processing device may determine, based on the frame type associated with each of the frames, to encode the media item using two or more of a hardware encoder, a software encoder, or a hybrid encoder. In some embodiments, the processing device may identify a computing resource requirement for encoding the media item. Processing logic may determine to encode the media item using two or more of the hardware encoder, the software encoder, or the hybrid encoder based on the frame type compared against the computing resource condition.

At block 410, the processing device may encode the frames using two or more of the hardware encoder, the software encoder, or the hybrid encoder in accordance with the determination. In some embodiments, responsive to determining a frame type associated with a frame of the multiple frames is a first frame type, the processing device may encode the frame using the hardware encoder. For example, responsive to determining the frame is a B-frame, the processing device may encode the frame using the hardware encoder. In some embodiments, responsive to determining the frame type associated with the frame is a second frame type, the processing device may encode the frame using the software encoder. For example, responsive to determining the frame is an I-frame, the processing device may encode the frame using the software encoder. In some embodiments, responsive to determining the frame type associated with the frame is a third frame type, the processing device may encode the frame using the hybrid encoder. For example, responsive to determining the frame is P-frame, the processing device may encode the frame using the hybrid encoder.

In some embodiments, encoding the frame using the hybrid encoder can include the processing device encoding the frame using a hardware encoder associated with the hybrid encoder. The processing device can identify additional metrics based on the encoding of the frame using the hardware encoder associated with the hybrid encoder. The processing device can determine to reencode the frame using one or more software encoding operations associated with the partial software encoder. The processing device can reencode the frame using one or more encoding operations associated with the partial software encoder.

In some embodiments, the processing may further determine to encode the media item using two or more of the hardware encoder, the software encoder, or the hybrid encoder based on at least one of a power level associated with a client device requesting access to the media item or an expected popularity level associated with the media item.

Figure 5:
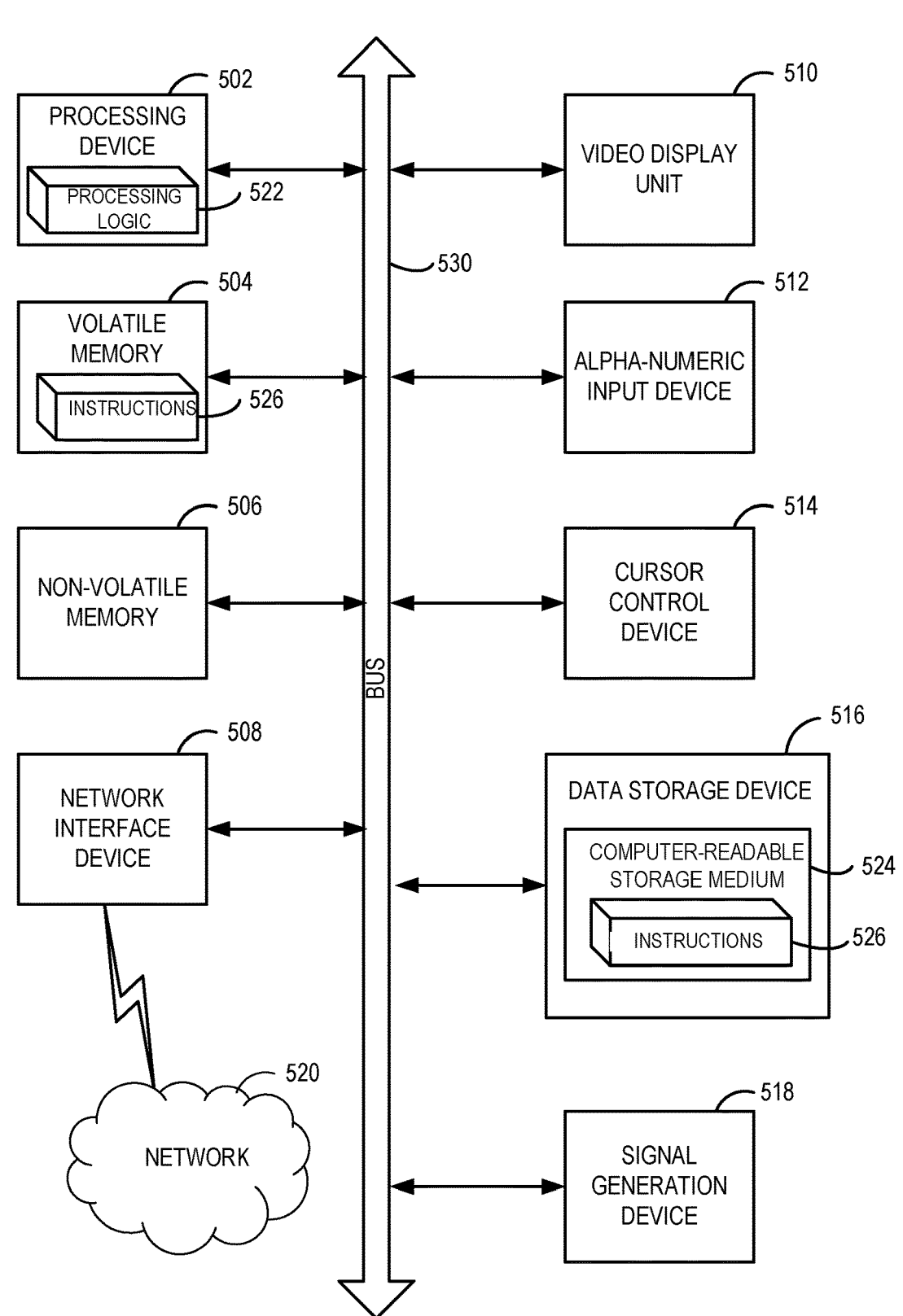
FIG. 5 is a block diagram illustrating one implementation of a computer system, in accordance with an implementation of the disclosure.

FIG. 5 is a block diagram illustrating an exemplary computer system, in accordance with implementations of the present disclosure. The computer system 500 can be the server machine 160 or client devices 130A-N in FIG. 1. The machine can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 540.

Processor (processing device) 502 represents one or more general-purpose processing devices such as a microprocessor, central processing unit, or the like. More particularly, the processor 502 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 can also be one or more special-purpose processing devices such as an application specific integrated circuit (ASIC), a field programmable gate array (FPGA), a digital signal processor (DSP), network processor, or the like. The processor 502 is configured to execute instructions 505 for performing the operations discussed herein.

The computer system 500 can further include a network interface device 508. The computer system 500 also can include a video display unit 510 (e.g., a liquid crystal display (LCD) or a cathode ray tube (CRT)), an input device 512 (e.g., a keyboard, and alphanumeric keyboard, a motion sensing input device, touch screen), a cursor control device 614 (e.g., a mouse), and a signal generation device 520 (e.g., a speaker).

The data storage device 518 can include a non-transitory machine-readable storage medium 524 (also computer-readable storage medium) on which is stored one or more sets of instructions 505 (e.g., for obtaining optimized encoder parameter settings) embodying any one or more of the methodologies or functions described herein. The instructions can also reside, completely or at least partially, within the main memory 504 and/or within the processor 502 during execution thereof by the computer system 500, the main memory 504 and the processor 502 also constituting machine-readable storage media. The instructions can further be transmitted or received over a network 530 via the network interface device 508.

While the computer-readable storage medium 524 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user may opt-in or opt-out of participating in such data collection activities. In one implementation, the collect data is anonymized prior to performing any analysis to obtain any statistical patterns so that the identity of the user cannot be determined from the collected data.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above. The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:

identifying a media item to be provided to one or more users of a platform, wherein the media item comprises a plurality of frames;

performing a first encoding pass with respect to the plurality of frames using a first encoder comprising one of a hardware encoder, a software encoder, or a hybrid encoder, wherein an output of the first encoding pass comprises metrics for the plurality of frames corresponding to at least one of a temporal structure or a spatial structure associated with the plurality of frames;

determining a frame type associated with each of the plurality of frames of the media item based on the metrics obtained for the plurality of frames;

determining, based on the frame type associated with each of the plurality of frames, whether to perform a second encoding pass with respect to the plurality of frames using the first encoder or a second encoder comprising one of the hardware encoder, the software encoder, or the hybrid encoder, wherein the second encoder is distinct from the first encoder; and performing the second encoding pass with respect to the plurality of frames using the first encoder or the second encoder.

2. The method of claim 1, wherein the metrics for the plurality of frames comprise a quality impact metric, the quality impact metric indicating a level of impact of the frame type of each of the plurality of frames on a quality of the media item.

3. The method of claim 2, wherein determining, based on the frame type associated with each of the plurality of frames, whether to perform the second encoding pass comprises:

identifying a computing resource condition for encoding the media item; and determining to encode the media item using two or more of the hardware encoder, the software encoder, or the hybrid encoder based on the frame type compared against the computing resource condition.

4. The method of claim 1, wherein performing the second encoding pass with respect to the plurality of frames using the first encoder or the second encoder comprises:

responsive to determining a frame type associated with a frame of the plurality of frames is a first frame type, encoding the frame using the hardware encoder;

responsive to determining the frame type associated with the frame is a second frame type, encoding the frame using the software encoder; and responsive to determining the frame type associated with the frame is a third frame type, encoding the frame using the hybrid encoder.

5. The method of claim 4, wherein encoding the frame using the hybrid encoder comprises:

encoding the frame using a hardware encoder associated with the hybrid encoder;

identifying additional metrics based on the encoding of frame using the hardware encoder associated with the hybrid encoder;

determining to re-encode the frame using one or more software encoding operations associated with the software encoder; and reencoding the frame using one or more encoding operations associated with the software encoder.

6. The method of claim 1, wherein determining whether to perform the second encoding pass with respect to the plurality of frames using the first encoder or the second encoder is further based on at least one of a power level associated with a client device requesting access to the media item or an expected popularity level associated with the media item.

7. The method of claim 1, wherein the frame type comprises one or more of an intra-coded picture frame type, a predicted picture frame type, or a bidirectional predicted picture frame type.

8. A system comprising:

a memory device; and a processor coupled to the memory device to perform operations comprising:

identifying a media item to be provided to one or more users of a platform, wherein the media item comprises a plurality of frames;

performing a first encoding pass with respect to the plurality of frames using a first encoder comprising one of a hardware encoder, a software encoder, or a hybrid encoder, wherein an output of the first encoding pass comprises metrics for the plurality of frames corresponding to at least one of a temporal structure or a spatial structure associated with the plurality of frames;

determining a frame type associated with each of the plurality of frames of the media item based on the metrics obtained for the plurality of frames;

determining, based on the frame type associated with each of the plurality of frames, whether to perform a second encoding pass with respect to the plurality of frames using the first encoder or a second encoder comprising one of the hardware encoder, the software encoder, or the hybrid encoder, wherein the second encoder is distinct from the first encoder to encode the media item using two or more of a hardware encoder, a software encoder, or a hybrid encoder; and performing the second encoding pass with respect to the plurality of frames using the first encoder or the second encoder encoding the plurality of frames of the media item using the two or more of the hardware encoder, the software encoder, or the hybrid encoder in accordance with the determination.

9. The system of claim 8, wherein the metrics for the plurality of frames comprise a quality impact metric, the quality impact metric indicating a level of impact of the frame type of each of the plurality of frames on a quality of the media item.

10. The system of claim 9, wherein determining, based on the frame type associated with each of the plurality of frames, whether to perform the second encoding pass comprises:

identifying a computing resource condition for encoding the media item; and determining to encode the media item using two or more of the hardware encoder, the software encoder, or the hybrid encoder based on the frame type compared against the computing resource condition.

11. The system of claim 8, wherein performing the second encoding pass with respect to the plurality of frames using the first encoder or the second encoder comprises:

responsive to determining a frame type associated with a frame of the plurality of frames is a first frame type, encoding the frame using the hardware encoder;

responsive to determining the frame type associated with the frame is a second frame type, encoding the frame using the software encoder; and responsive to determining the frame type associated with the frame is a third frame type, encoding the frame using the hybrid encoder.

12. The system of claim 11, wherein encoding the frame using the hybrid encoder comprises:

encoding the frame using a hardware encoder associated with the hybrid encoder;

identifying additional metrics based on the encoding of frame using the hardware encoder associated with the hybrid encoder;

determining to re-encode the frame using one or more software encoding operations associated with the software encoder; and reencoding the frame using one or more encoding operations associated with the software encoder.

13. The system of claim 8, wherein determining whether to perform the second encoding pass with respect to the plurality of frames using the first encoder or the second encoder is further based on at least one of a power level associated with a client device requesting access to the media item or an expected popularity level associated with the media item.

14. The system of claim 8, wherein the frame type comprises one or more of an intra-coded picture frame type, a predicted picture frame type, or a bidirectional predicted picture frame type.

15. A non-transitory computer readable storage medium comprising instructions for a server that, when executed by a processor, cause the processor to perform operations comprising:

identifying a media item to be provided to one or more users of a platform, wherein the media item comprises a plurality of frames;

performing a first encoding pass with respect to the plurality of frames using a first encoder comprising one of a hardware encoder, a software encoder, or a hybrid encoder, wherein an output of the first encoding pass comprises metrics for the plurality of frames corresponding to at least one of a temporal structure or a spatial structure associated with the plurality of frames;

determining a frame type associated with each of the plurality of frames of the media item based on the metrics obtained for the plurality of frames;

determining, based on the frame type associated with each of the plurality of frames, whether to perform a second encoding pass with respect to the plurality of frames using the first encoder or a second encoder comprising one of the hardware encoder, the software encoder, or the hybrid encoder, wherein the second encoder is distinct from the first encoder; and performing the second encoding pass with respect to the plurality of frames using the first encoder or the second encoder.

16. The non-transitory computer readable storage medium of claim 15, wherein the metrics for the plurality of frames comprise a quality impact metric, the quality impact metric indicating a level of impact of the frame type of each of the plurality of frames on a quality of the media item.

17. The non-transitory computer readable storage medium of claim 16, wherein determining, based on the frame type associated with each of the plurality of frames, whether to perform the second encoding pass comprises:

identifying a computing resource condition for encoding the media item; and determining to encode the media item using two or more of the hardware encoder, the software encoder, or the hybrid encoder based on the frame type compared against the computing resource condition.

\* \* \* \* \*